Nov. 6, 1951 H. E. GOLDSTINE 2,574,326
GENERATING GROUPS OF CURRENTS
Filed Dec. 2, 1947
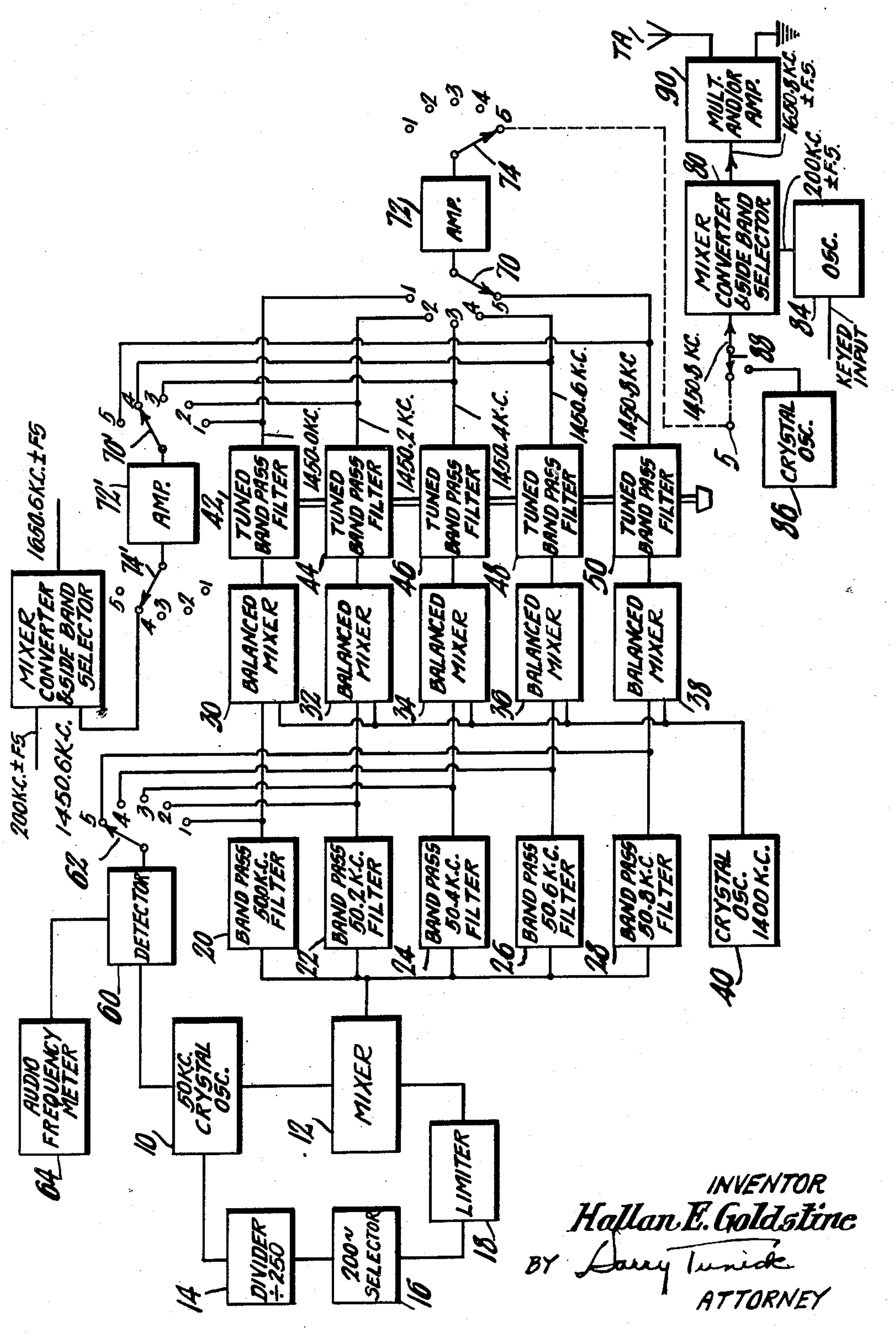
INVENTOR
Hallan E. Goldstine
BY Harry Tunick
ATTORNEY Patented Nov. 6, 1951

2,574,326

UNITED STATES PATENT OFFICE 2,574,326

GENERATING GROUPS OF CURRENTS

Hallan E. Goldstine, Port Jefferson, N. Y., assignor to Radio Corporation of America, a corporation of Delaware Application December 2, 1947, Serial No. 789,255

3 Claims. (Cl. 250—36)

In this application, I disclose an improved method of and means for generating a plurality of currents or voltages of wave form which are of substantially constant frequency and are closely and uniformly spaced from each other in the frequency spectrum.

Electrical energy of this character has many uses in the electronic art, for example, it is of wide use for excitation of transmitters in short wave communication services especially in regard to trans-oceanic and long distance short wave communication by telegraphy. In these systems, it is often desirable to use a number of transmitters which have their carrier frequencies closely spaced in the frequency spectrum to permit such a group of transmitted carriers all to be received on one or more receivers. Where more than one receiver is used, the receivers may be in diversity. This allows the transmitter to be operated in a so called frequency diversity manner, and at the same time, have the receivers operating in a space diversity manner, thus obtaining the advantages of frequency and space diversity. The same signal may be operated on one or more transmitters and received on one or more receivers to obtain a frequency diversity effect, or a different signal may be supplied to each transmitter; or, if desired, time division multiplex signals may be supplied to one or several other transmitters. However, by using several transmitters with closer spaced frequencies in place of time division multiplex the keying speed of each transmitter may be reduced accordingly and the multipath would have correspondingly less effect on the signals operating at a lower keying speed. It is also of advantage to utilize frequency shift keying on each of the separate transmitters thereby also obtaining the advantages of frequency shift keying.

The primary and general object of my invention, therefore, is to provide an improved method and means for generating a plurality of voltages or currents of wave form and of frequencies which are substantially fixed and are closely related in the frequency spectrum.

In describing my invention in detail, reference will be made to the attached drawing wherein the single figure illustrates schematically and mainly by block diagram and line connection a generating invention arranged in accordance with my system.

In the drawing, 10 is a source of oscillatory energy of substantially fixed frequency such as is obtained by crystal controlled oscillators of approved types known in the art. The unit 10 may include an oscillator and frequency multipliers where the oscillator operates at a relatively low frequency. 12 is a mixer of any approved type having as one input oscillatory energy from the source 10. 14 is a frequency changer of any approved type preferably of the multivibrator type wherein the multivibrator circuits are entrained by oscillatory energy from the source 10. In the example given, for descriptive purposes, 14 is a divider and where the oscillatory source in 10 has an output at 50 kc. the divider may reduce this frequency by a factor $N=250$. Oscillatory energy of the divided frequency is selected from the output of the divider 14 by a selector circuit 16 and in the example given, this energy is at 200 cycles per second. The selector in 16 may comprise tuned circuits or a filter network such as a band pass filter. The selected energy is fed to a current amplitude limiter 18 wherein the current wave form is squared up and is then supplied as a second input to the mixer 12. The current amplitude limiter in 18 may comprise a tube operated at saturation or preferably an arrangement as disclosed in Crosby Patent #2,276,565. The purpose of squaring off the wave energy fed by the limiter 18 to the mixer 12 wherein mixing of the carrier from 10 with the current from 18 takes place is to insure a mixer output which is rich in components of harmonics of the frequency of the currents supplied by the limiter 18 to the mixer 12. In the example given, harmonics of the 200 cycle current from 16 appear in the mixer output components.

A series of selector circuits 20, 22, 24, 26 and 28 are coupled at their inputs to the mixer 12 for selecting the desired mixer components. In the example given, these units 20 to 28 inclusive are band pass filters and select a series of mixer components including the main carrier and the same plus the first, second or third or fourth harmonics of the current from the unit 16. When this selection is made, the mixer in unit 12 is not such as to suppress the carrier supplied from 10. However, a balanced type of mixer may be used and the carrier suppressed. This output, which consists of the carrier from source 10 and a number of 200 cycle side bands progressing in frequency, is selected in the filters 20 to 28 inclusive and supplied to mixers 30, 32, 34, 36 and 38. Where the frequencies selected include the carrier of source 10 as in the example given, then a carrier suppressor mixer is not used in unit 12. The mixers 30 to 38 are of the carrier suppressor type and may be of the type known as balanced mixers. These mixers are well known in the art and need no description here. The side bands selected at 20 to 28 inclusive are used as one set of inputs to the mixers 30 to 38 inclusive and they mix with oscillatory energy of relatively high and substantially fixed frequency from the source 40, which may comprise a crystal oscillator and/or frequency multipliers. The oscillations from the source 40 are assumed to be applied to the balanced mixers in such a manner that they are suppressed in the mixer output so that side band energy only appears at the outputs of the mixers 30 to 38. Selective circuits 42, 44, 46, 48 and 50 are coupled to the outputs of balanced mixers 30 to 38 respectively and these selective circuits may comprise tunable band pass filters. By these filters, I select the desired side bands for use as desired. In the example given, the upper side bands are selected and band pass filters 42, 44, 46, 48 and 50 supply as outputs respectively carrier currents of 1450.0 kc., 1450.2 kc., 1450.4 kc., 1450.6 kc., and 1450.8 kc.

The output of mixer 12, which is not of the carrier suppressor type, supplies carriers separated by 200 cycles, that is, by a frequency interval equal to the frequency of the current selected in 16. The bands passed by the band pass filters 42 to 50 are likewise spaced 200 cycles apart in the frequency spectrum.

A detector 60 and audio frequency meter 64 is arranged for beating the output of any one of the band pass filters 20 to 28 inclusive with output from the crystal oscillator 10 for monitoring purposes. If the frequency at the output of, say filter 20, is proper, that is, at 50 kc., then zero beat note will be produced in the audio frequency meter 64 when the output of 20 is mixed with the output of 10 in the detector 60. Now, if the output of filter 28 is fed by switch 62 to the detector 60, an 800 cycle audio note will appear in the audio frequency meter 64.

The frequency of the crystal oscillator 40 is determined by the use to which the output of the tuned band pass filters 42 to 50 is to be put. For example, if transmitters are to be excited by these outputs, then the frequency of the crystal oscillator 40, as modified by being mixed in the balanced mixers 30 to 38 by the side bands selected in filters 20 to 28, is related to the final transmitter output frequency wanted and to the number of frequency multipliers it is desired to use. The selected outputs are fed by switches 70 and 70′ and so forth to amplifiers 72, 72′ and so forth. The amplifiers 72 and 72′, etc., are also buffer stages. The amplified output is then fed by switches 74, 74′, etc. to utilization means. The amplifiers 72, 72′, etc. have a band width wide enough to accept any one of the frequencies passed by tuned band pass filters 42 to 50 inclusive. The amplified carriers may then be supplied by switches 74 and 74′ to coaxial cables (not shown) running to the input of frequency shift keying units. For example, a keying unit of this type might comprise, a mixer and side band selectors 80 to which frequency shifted oscillatory energy from a source 84 is fed to mix therein with oscillatory energy of the desired frequency supplied from an oscillator 86. Then the output from switch 74 generated in accordance with my invention would replace the crystal source 86 in the mixer 80. Then the switch 88 is moved to the position shown to connect contact 5 to the mixer 80 input. The oscillatory energy in 84 might be of relatively low or intermediate frequency and might have its frequency modulated in accordance with signals. In the example given, it is shifted in frequency in a well known manner by the signals, and might be of a frequency equal to 200 kc.±FS. Then, if I select the upper side band at the output of mixer 80, I have energy of 1650.8 kc.±FS, and this output carrying the frequency shifted signal is supplied to multipliers and/or amplifiers of conventional form in the unit 90 and then fed to the transmitting antenna TA. By means of the switches 70, 74, etc. any frequency in the entire group can be supplied to any transmitter in the group to provide flexibility in selection of transmitter and antenna combinations.

What is claimed is:

1. In apparatus for generating a plurality of oscillatory energies of substantially fixed frequencies uniformly spaced in the frequency spectrum, in combination, an oscillation generator of substantially fixed frequency F, a mixer having one input coupled to the oscillation generator, a frequency divider having a division factor N and a current amplitude limiter in cascade in a coupling between the oscillation generator and another mixer input and a plurality of band pass filters, tuned to frequencies separated in the frequency spectrum by a frequency equal to F divided by N, coupled to the mixer output to select said plurality of oscillatory energies.

2. In apparatus for generating a plurality of high frequency oscillatory energies of substantially fixed frequencies uniformly spaced in the frequency spectrum, in combination, an oscillation generator of substantially fixed frequency F, a mixer having one input coupled to the oscillation generator, a frequency divider having a division factor N and a current amplitude limiter in cascade in a coupling between the oscillation generator and another mixer input, a plurality of band pass filters, tuned to frequencies separated in the frequency spectrum by a frequency equal to F divided by N, coupled to the mixer output, a balanced mixer for each band pass filter having an input coupled to its band pass filter, a source of oscillatory energy of high and substantially fixed frequency coupled to all of the balanced mixers, and a band pass filter coupled to each balanced mixer, said last-named band pass filters being arranged to pass bands of energy separated in the frequency spectrum by a frequency equal to F divided by N.

3. In apparatus for generating a plurality of oscillatory energies of substantially fixed frequencies uniformly spaced in the frequency spectrum, in combination, an oscillation generator of substantially fixed frequency, a mixer having one input coupled to the oscillation generator, a frequency changer in a coupling between said generator and another mixer input, apparatus in the last-named coupling to square up the form of the wave energy fed by the frequency changer to the mixer so that one input to the mixer is rich in harmonics of the wave energy output of the frequency changer, and a plurality of selective circuits, tuned to frequencies separated by a substantially fixed frequency equal to the frequency of the output of the frequency changer, coupled to the output of said mixer to select said plurality of oscillatory energies.

HALLAN E. GOLDSTINE.

(References on following page)

REFERENCES CITED

The following references are of record in the file of this patent:

UNITED STATES PATENTS

| Number | Name | Date |
|---|---|---|
| 1,592,885 | Fetter | July 20, 1926 |
| 1,725,566 | Chesnut | Aug. 20, 1929 |
| 2,028,212 | Heising | Jan. 21, 1936 |
| 2,213,320 | Mathes et al. | Sept. 3, 1940 |
| 2,398,694 | Case | Apr. 16, 1946 |
| 2,407,259 | Dickieson | Sept. 10, 1946 |
| 2,433,343 | Chatterjea et al. | Dec. 30, 1947 |

FOREIGN PATENTS

| Number | Country | Date |
|---|---|---|
| 474,021 | Great Britain | Oct. 25, 1937 |